(12) United States Patent
Thompson et al.

(10) Patent No.: US 11,537,488 B2
(45) Date of Patent: Dec. 27, 2022

(54) PORTABLE POWER MANAGEMENT PROFILE FOR AN INFORMATION HANDLING SYSTEM

(71) Applicant: Dell Products L.P., Round Rock, TX (US)

(72) Inventors: Richard C. Thompson, Cedar Park, TX (US); Nikhil M. Vichare, Austin, TX (US); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 112 days.

(21) Appl. No.: 16/738,154

(22) Filed: Jan. 9, 2020

(65) Prior Publication Data

US 2021/0216428 A1    Jul. 15, 2021

(51) Int. Cl.
| | |
|---|---|
| *G06F 11/30* | (2006.01) |
| *G06F 1/3206* | (2019.01) |
| *G06F 11/34* | (2006.01) |
| *G06F 1/3296* | (2019.01) |
| *G06F 1/3212* | (2019.01) |

(52) U.S. Cl.
CPC ........ *G06F 11/3062* (2013.01); *G06F 1/3206* (2013.01); *G06F 11/3438* (2013.01)

(58) Field of Classification Search
CPC . G06F 1/3206; G06F 11/3438; G06F 11/3062
See application file for complete search history.

(56) References Cited

U.S. PATENT DOCUMENTS

| | | | | |
|---|---|---|---|---|
| 2002/0087625 | A1* | 7/2002 | Toll ..................... | H04L 69/329 709/203 |
| 2002/0171679 | A1* | 11/2002 | Clapper .............. | G06F 9/4416 715/748 |
| 2005/0257006 | A1* | 11/2005 | Yoshida ............ | G05B 23/0283 711/118 |
| 2012/0117558 | A1* | 5/2012 | Futty ................... | G06F 8/61 717/176 |
| 2015/0019889 | A1* | 1/2015 | Banerjee ............. | G06F 1/26 713/320 |
| 2016/0103996 | A1* | 4/2016 | Salajegheh .......... | H04L 63/145 726/25 |
| 2017/0045932 | A1* | 2/2017 | Bostick ............... | G06Q 10/06 |
| 2018/0120923 | A1* | 5/2018 | Srinivasan ........... | G06F 1/3278 |
| 2019/0305597 | A1* | 10/2019 | Venkatraman ........ | H02J 50/80 |
| 2020/0209939 | A1* | 7/2020 | Chao .................. | G06F 1/206 |

\* cited by examiner

*Primary Examiner* — Jaweed A Abbaszadeh
*Assistant Examiner* — Gayathri Sampath
(74) *Attorney, Agent, or Firm* — Norton Rose Fulbright US LLP (57) ABSTRACT

An user profile may be used to adjust one or more system power management settings of an information handling system. An information handling system may transmit one or more user profile credentials. The information handling system may receive user profile data and may compare the user profile data with one or more system characteristics of the information handling system. Based on the comparison of the user profile data with the system characteristics of the information handling system, the information handling system may adjust one or more power management settings of the information handling system.

20 Claims, 5 Drawing Sheets

PORTABLE POWER MANAGEMENT PROFILE FOR AN INFORMATION HANDLING SYSTEM

FIELD OF THE DISCLOSURE

The instant disclosure relates to information handling system power management. More specifically, portions of this disclosure relate to a portable power management profile for an information handling system.

BACKGROUND

As the value and use of information increase, individuals and businesses seek additional ways to process and store information. One option available for such a purpose is the information handling system. An information handling system generally processes, compiles, stores, and/or communicates information or data for business, personal, or other purposes thereby allowing users to take advantage of the value of the information. Because technology and information handling requirements vary between different users or applications, information handling systems may also vary regarding what information is handled, how the information is handled, how much information is processed, stored, or communicated, and how quickly and efficiently the information may be processed, stored, or communicated. Variations in information handling system build and capabilities allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling system power consumption can vary based on user habits. For example, information handling systems operated by users engaged in processing intensive applications such as graphic design, video or image editing, intensive data processing, and gaming may consume more power than information handling systems operated by users engaged in word processing, email, and other low power user applications. Usage habits can affect battery lifetime, with more power intensive activities causing a battery to drain more rapidly.

Various system settings can be adjusted to optimize system operation based on user behavior. For example, battery charging settings may be adjusted based on usage behavior. Power consumption settings may also be adjusted. These settings may be adjusted manually by a user based on the user's expected system usage. However, many users may be confused by settings options or may not have a full understanding of their usage habits. Such confusion can negatively impact a user experience. Further, when a user migrates to a new information handling system, such as when purchasing a new information handling system or using a temporary replacement system, a user may be required to again manually adjust power management settings. Manual adjustment of power management settings is inconvenient and may negatively impact a user experience. In some cases a user may neglect to update power management settings on a new or replacement information handling system, negatively impacting battery lifetime and/or system performance.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

A user profile may be assembled based on usage data gathered from a first information handling system and used to automatically determine one or more power management settings of the information handling system. If the user begins to use a second information handling system, such as after purchase of a new information handling system, user profile data associated with the user profile, such as usage data, may be transferred to the second information handling system and may be used to automatically adjust one or more power management settings of the second information handling system. In some cases, the power management settings of the second information handling system may be adjusted to be identical to the power management settings of the first information handling system. In other cases, the power management settings on the second information handling system may be adjusted based on differences between the first information handling system and the second information handling system, such as differences in power consumption, battery level, and/or battery health. Thus, a user profile may follow a user from information handling system to information handling system, allowing for automatic adjustment of power management settings based on the user's usage habits. Such a portable user profile can improve performance of an information handling system by removing the need to collect and analyze usage data over a period of days or weeks before tailoring power management settings to the user's habits whenever a user begins to use a new information handling system.

When a user begins use of a new information handling system, a user profile created with data gathered from a prior information handling system used by the user may be used to adjust one or more power management settings of the new information handling system. A method for information handling system power management may begin with transmitting, by an information handling system, one or more user profile credentials for a user profile. For example, when a user begins use of a new information handling system, a user may login or enter a user identifier, such as a username or network identifier. In some cases, a user may log in to an optimization application on the system. User credentials entered by the user may be transmitted to a remote information handling system. The remote information handling system may, for example, store a user profile for the user, including usage data associated with the user profile collected from an information handling system previously used by the user. The remote information handling system may also collect usage data, such as telemetry data, user persona classifications, power management settings data, and system characteristics from other information handling systems and may use that data to create co-occurrence mapping data. For example, the remote information handling system may determine that certain usage patterns and/or certain user persona classifications are most frequently associated with certain power management settings when present on a system with certain system characteristics, such as hardware characteristics.

The information handling system may receive user profile data associated with a user profile that was generated based on usage of a second information handling system, different from the first information handling system. For example, the remote information handling system may transmit user profile data associated with the user profile to the client information handling system. Alternatively, the information handling system may load user profile data associated with the user profile from an external memory device, such as an external hard disk or solid state drive, or from an internal hard disk or solid state drive. The user profile data may include, for example, usage data such as telemetry data collected from a previously used information handling system, system characteristics of the previously used information handling system, and/or a user persona classification for the user profile associated with one or more typical classes of user behavior. In some embodiments, the information handling system may also receive co-occurrence mapping data from the remote information handling system. Co-occurrence mapping data may specify certain power management settings that match usage data and/or a user persona classification associated with the user profile that may optimize power management of the information handling system based on information received from other information handling systems.

The information handling system may then compare the user profile data with one or more system characteristics of the information handling system. The system characteristics may include a health of a battery of the information handling system, a capacity of the battery of the information handling system, hardware components of the information handling system, such as whether the information handling system includes a hard disk or a solid state drive, and/or a power consumption ranking of the information handling system. For example, the information handling system may compare usage data and/or a user persona classification received from the client information handling system with a battery health, battery capacity, or power consumption classification of the information handling system. Comparing the user profile data with the one or more system characteristics may include comparing the user profile data and one or more system characteristics of the information handling system with received co-occurrence mapping data.

Based on the comparison of the user profile data with the one or more system characteristics, the information handling system may adjust one or more power management settings. Power management settings may include policies such as battery charging policies and/or system power consumption management policies, such as runtime policies. For example, the information handling system may determine that, based on past usage data collected from a previously used information handling system associated with the user profile and/or based on a user profile persona classification, a first battery charging policy should be implemented to enhance battery lifetime. In such a determination, the information handling system may take into account differences in system properties, such as hardware differences, between the information handling system and the previously used information handling system and may adjust power management settings accordingly. For example, the information handling system may have a battery with a higher battery health level and/or a greater battery capacity than an old information handling system and a battery charging policy may be adjusted to be different from a battery charging policy implemented on the old information handling system based on the difference in system characteristics between the information handling system and the old information handling system. In some embodiments, the information handling system may examine co-occurrence data to determine power management settings that have been applied in information handling systems with similar system characteristics that are associated with user profiles including similar usage data and/or usage persona classifications to the usage data and/or usage persona classification of the user profile associated with the information handling system to determine how system power management settings should be adjusted.

After the power management settings of the information handling system have been adjusted based on the comparison of the received user profile data with the system characteristics of the information handling system, the information handling system may proceed to monitor usage of the information handling system by the user. The information handling system may further adjust one or more power management settings based, at least in part, on the monitored usage of the information handling system. For example, if the user's usage habits change over time, such as beginning to use power intensive applications more frequently, the information handling system may adjust one or more power management settings in response to the change. In some embodiments an optimizer service may collect usage data, such as telemetry data, and transmit the data to the remote information handling for storage associated with the user profile.

An information handling system may include a memory and a processor for performing the steps described herein. Instructions for performing the steps described herein may be stored on a non-transitory computer readable medium.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, a two-in-one laptop/tablet computer, mobile device (e.g., personal digital assistant (PDA), smart phone, tablet computer, or smart watch), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more virtual or physical buses operable to transmit communications between the various hardware and/or software components.

Figure 1:
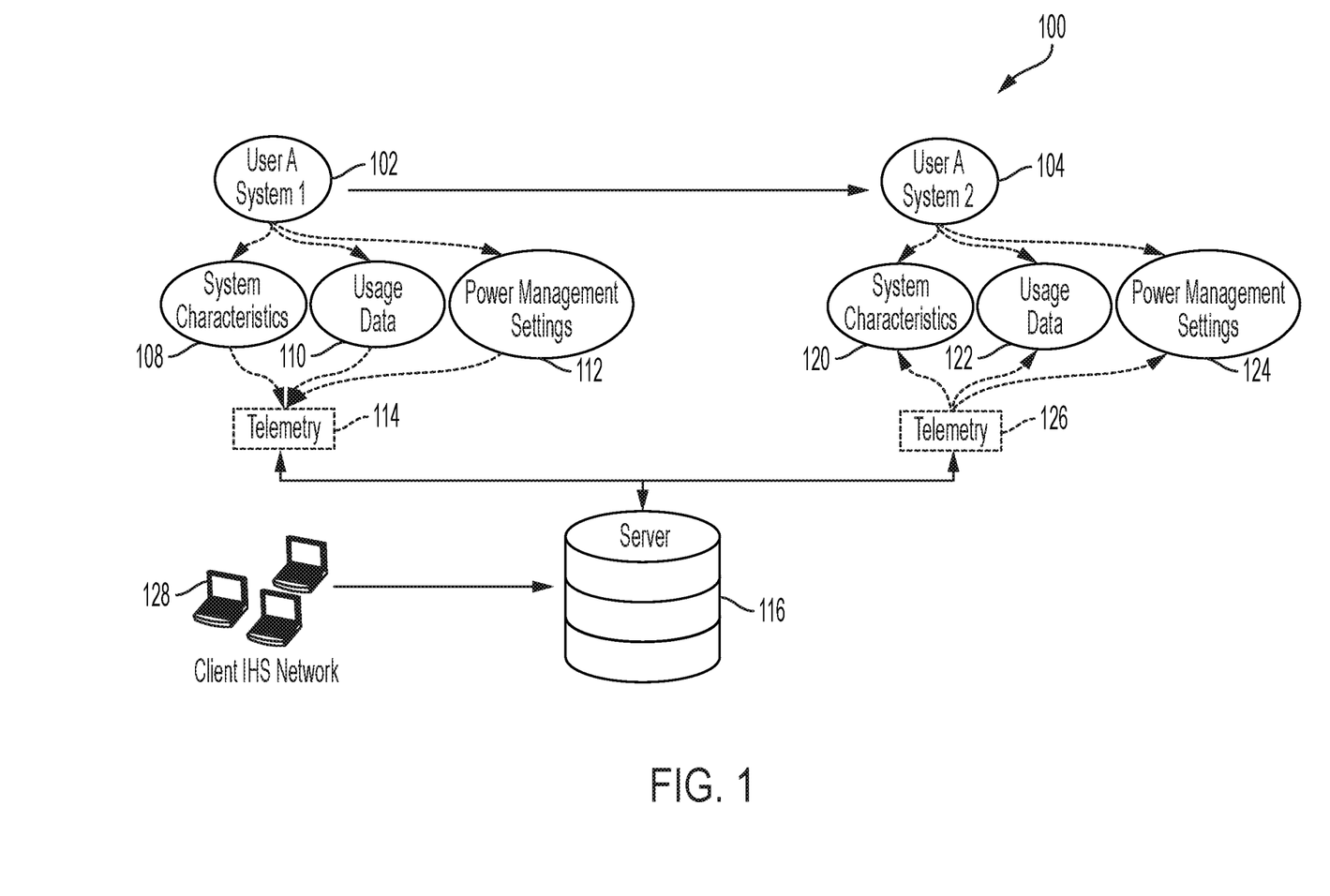
FIG. 1 is a diagram of an example system for adjusting power management settings on a second information handling system based on a user profile associated with a first information handling system according to some embodiments of the disclosure.

A single user may use multiple information handling systems. For example, a user may start with using a laptop computer at the office and may purchase an additional laptop computer for use at home. Users may also upgrade information handling systems when they become outdated or non-functional. When a user switches from an old information handling system to a new information handling system, user profile data collected from the old information handling system may be transferred to the new information handling system and used to adjust one or more power management settings of the new information handling system. An example system 100 for transferring user profile data from a previously used information handling system 102 to a new information handling system 104 is shown in FIG. 1. A user may create a user profile on an old information handling system 102. For example, the user profile may be a user profile associated with a power management optimization service. The old information handling system 102 may combine information entered by the user, such as a username and password, with usage data 122, such as telemetry data, collected while the user is using the old information handling system 102 to form a user profile. The usage data 122 may, for example, include data regarding the kinds of applications a user prefers to use, a user's average length of usage of the applications, a frequency of usage of the applications, a rate at which battery power is used, a battery charge rate, power consumption data, and other data. In some embodiments, the usage data may be used to assign the user profile a user persona classification. The old information handling system 102 may automatically adjust one or more power management settings 112 of the old information handling system 102 based on the usage data 110. For example, the old information handling system 102 may adjust one or more battery charge policies and system power consumption management policies based on the usage data 110. The old information handling system 102 may collect system characteristics 108 which may include an operating system, a basic input/output system (BIOS) version, a battery capacity, a battery health, a system power consumption ranking, and other system characteristics. For example, a power consumption ranking of the system may be set as high or low, depending on the amount of power consumed by the information handling system. The old information handling system 102 may transmit system characteristics 108, the usage data 110, and power management settings 112 to a server 116 for storage associated with a user profile. For example, the system characteristics 108, the usage data 110, and power management settings 112 may be transmitted to the server 116 in the form of telemetry data 114.

The server 116 may receive the system characteristics 108, the usage 110, and power management settings 112 from the old information handling system 106 and may associate the data with a user profile. The server 116 may also receive system characteristics, usage data, and power management settings from a client information handling system network 128 and may associate sets of receive system characteristics, usage data, and power management settings with multiple user profiles. The server 116 may be a single information handling system or may be a cloud of networked information handling systems.

The server 116 may process the received system characteristics, usage data, and power management settings to map co-occurrence of profiles, system characteristics, and power management settings, such as co-occurrence of certain usage behaviors or user persona classifications, hardware configurations, and policies such as battery charging policies. For example, the server may perform counting and stack ranking of usage data, system characteristics, and power management settings to determine power management settings that are commonly present on systems with certain system characteristics, such as certain battery profiles, processors, memory, and other hardware characteristics, used by users having user profiles with certain usage patterns, such as heavy use of gaming applications. Alternatively or additionally, the server 116 may perform network analysis on the user profile data, system characteristics, and power management settings to determine changes in power management settings that typically occur following changes in usage patterns shown in the user profile data or changes in system characteristics, such as upgrades of system components or an upgrade to an entirely new information handling system.

A user may migrate from the old information handling system 102 to the new information handling system 104. For example a user may buy an additional information handling system, may replace an outdated information handling system, or may borrow an information handling system for use while traveling, such as borrowing a laptop or other information handling system while visiting another office of their place of employment. Instead of requiring duplicative gathering and analysis of usage data on the new information handling system 104, the usage data 110, power management settings 112, and system characteristics 108 of the old information handling system 102 may be used to determine power management settings 124 of the new information handling system 104. For example, a user may log in to a user profile associated with a power management optimization service installed on the new information handling system 104 that connects with server 116. The user profile may, for example, be the user profile including data collected from the old information handling system 102. The server may transmit telemetry data 126 from the old information handling system 102 to the new information handling system 104 including usage data 110, power management settings 112, and system characteristics 108. The server may further transmit co-occurrence mapping data to the new information handling system 104. The new information handling system 104 may determine one or more power management settings 124 for the new information handling system 104 based on the received telemetry data 126 and/or co-occurrence mapping data. The power management settings 124 applied on the new information handling system 104 may be set to a different configuration from the power management settings 112 applied on the old information handling system 102 based on the system characteristics 120 of the new information handling system, such as based on hardware differences between the old information handling system 102 and the new information handling system 104. In some embodiments, co-occurrence mapping data may be used to determine the adjustment of power management settings 124 such as by configuring the power management settings of the new information handling system to match power management settings found on information handling systems with similar system characteristics operated by users with similar user profiles.

Multiple user profiles may be stored on the server 116. As one example, a user profile may include a corridor warrior user persona, determined based on user data collected from the old information handling system 102. The user profile may further include system characteristics of the old information handling system 102, such as a system configuration of Precision 5510 Configuration 1, a battery capacity characteristic of 65 W-Hr, and a battery health characteristic of 75% to 100%. The user profile may also include one or more system power management settings 124 for the first information handling system, such as a charge policy of express charge 1 and a first runtime power management policy, such as a policy A. The user may begin use of a new information handling system 104 having a system configuration of Precision 5520 configuration 1, a battery capacity characteristic of 90 W-Hr, and a battery health characteristic of 75% to 100%. The user persona characteristic may remain as a corridor warrior persona across a transition from the old information handling system 102 to the new information handling system 104. In some embodiments, the new information handling system may have one or more features that were not present on the old information handling system. For example, the new information handling system may have a fast charge capability, such as an updated charging capability that may be activated by setting an express charge 2 policy. Based on the characteristics of the new information handling system 104, such as a faster system charge feature, and information collected regarding usage of the old information handling system 102, the charge policy of the new information handling system may be set to express charge 2 instead of express charge 1 to utilize the enhanced charge capabilities. For example, the new information handling system In some embodiments, the battery health data may be more precise. For example, a first information handling system may have a battery health of 80%, while a second information handling system may have a battery health of 95%. A user profile for another user may include a desktop replacement user persona, determined based on collected user data, and may further include system characteristics of an information handling system such as a system configuration of Precision 5520 Configuration 3 and a battery capacity characteristic of 90 W-Hr. The user profile may also include one or more system power management settings for the information handling system, such as a charge policy of primary alternating current (AC) use assigned to users who primarily operate the system while connected to an AC power source. As another example, a user profile may include a marathon battery user persona, determined based on collected user data, and may further include system characteristics of an information handling system such as a system configuration of Precision 5520 Configuration 1 and a battery capacity characteristic of 65 W-Hr. The user profile may also include one or more system power management settings for the information handling system, such as a charge policy of express 1 and a second runtime power management policy such as policy B. Such data may be used by the server 112 to perform co-occurrence mapping.

In some embodiments, power management settings 124 may be applied based on co-occurrence data that reflects changes in system characteristics and corresponding changes in power management settings 124. For example, a user, having a similar usage profile to the user of information handling systems 102, 104, of an information handling system having similar system characteristics to the old information handling system 102 in the client information handling system network 128 may have upgraded to an information handling system with similar system characteristics to the new information handling system 104. A change in power management settings following the upgrade may be used to determine the power management settings 124 of the new information handling system 104. Thus, usage data for a user on an old information handling system 102 may be used to determine power management settings 124 for a new information handling system 104. Those power management settings 124 may diverge from the power management settings 112 of the old information handling system 102 based on the difference between system characteristics 108 of the old information handling system 102 and system characteristics 120 of the new information handling system 104.

Figure 2:
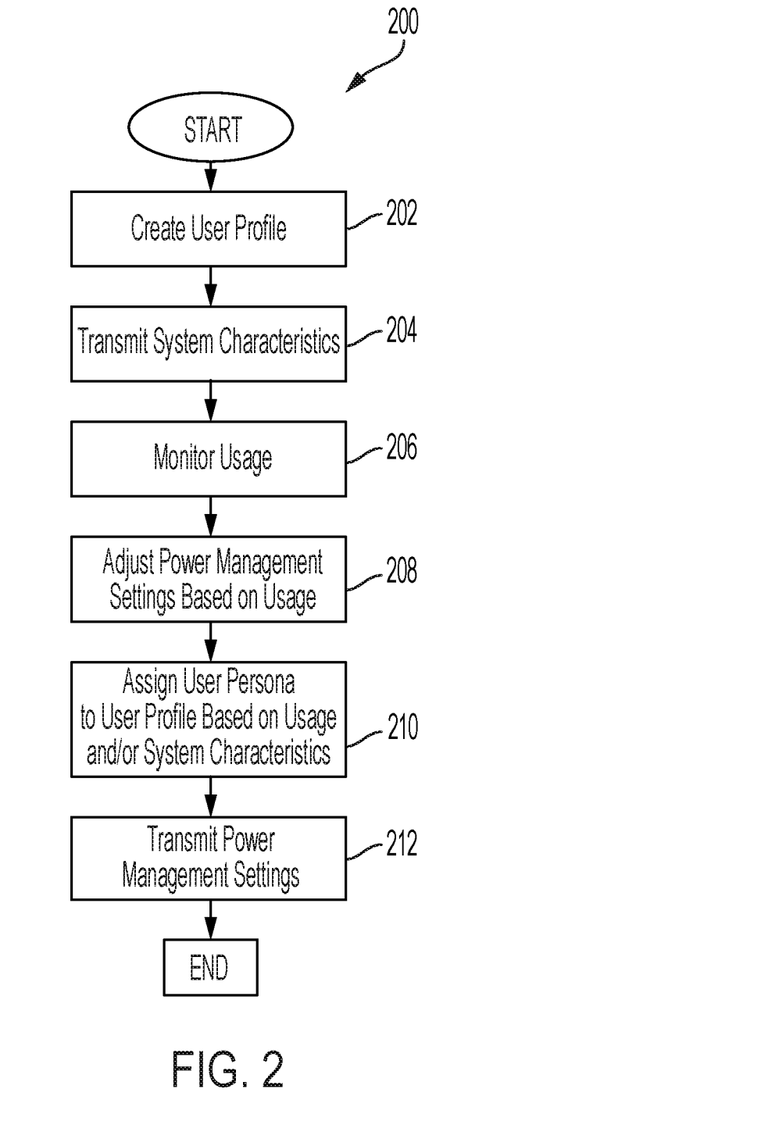
FIG. 2 is a flow chart of an example method for adjusting power management settings based on usage and transmitting usage data to a remote information handling system according to some embodiments of the disclosure.

Power management settings of an information handling system may be adjusted automatically based on user behavior, and user behavior data and system characteristics of the information handling system may be stored and associated with a user profile on a remote server. A method 200 for automatically adjusting power management settings may begin, at step 202, with creation of a user profile. For example, a user may activate a power management optimization service on an information handling system, and may create a user profile. The user profile may include credentials, such as a username, an identifier, a password, a network identifier, and other credential information for identifying and authenticating the user. The user profile data may be transmitted to and stored on a remote server. At step 204, the information handling system may transmit system characteristics to a remote information handling system. For example, the information handling system may transmit system characteristics including a battery capacity, battery health, power consumption statistics, a processor, memory, a graphics card, display information, an operating system, a BIOS version, how often the information handling system is connected to an external power source, a speed at which the battery drains, a speed at which the battery charges, and other system characteristics. For example, an information handling system may transmit an indicator of a high-power consumption ranking, a battery capacity of 65 W-Hr, and a battery health range of 50% to 75%. The remote server may receive the system characteristics and may associate them with the user profile.

At step 206, the information handling system may monitor usage by the user. For example, the information handling system may monitor applications used by the user, a frequency of use of applications, a length of time that applications are used, power consumption, display brightness, sound usage, graphics card usage, battery usage data specifying battery charge over time, external power source data specifying times when the information handling system is connected to an external power source, and other usage by the user. Monitoring usage may also include transmitting usage data to the remote server for association with the user profile. The information handling system may monitor user behavior over a period of days, weeks, or months to collect usage data for association with the user profile.

At step 208, the information handling system may adjust power management settings based on the usage. For example, the information handling system may adjust a battery charging policy or a power consumption management policy based on usage by a user. If a user frequently uses processing intensive applications that use a substantial amount of power, the information handling system may activate a battery charging policy that makes more power available for use by the information handling system while requiring more time to charge the battery. On the other hand, if a user frequently uses applications that do not consume much power, but frequently operates the information handling system off of internal battery power, a battery charging policy may be adjusted to prioritize battery charging over other considerations.

At step 210, a user persona may be assigned to the user profile. For example, a user persona may be a broad classification that is assigned to a user profile based on usage data. One user persona may, for example, be a corridor warrior persona, which may be assigned to user profiles of users that frequently use applications that consume a substantial amount of power but frequently operate the information handling system while connected to an external power source. Another user persona may be a desktop replacement persona or primarily AC user for users that are almost always connected to an external power source. Such a persona may be assigned to users that rarely have a user present battery discharge of below 50% of battery capacity. A third possible user persona may be marathon battery user persona, which may be assigned to user profiles for users that frequently operate the information handling system off of internal battery power for extended periods of time. The information handling system may transmit the persona classification to the remote server for association with the user profile.

At step 212, the information handling system may transmit the power management settings to the remote information handlings system for association with the user profile. In some embodiments, the system characteristics, user profile, and power management settings may be mapped along with user profiles from other information handling systems to produce co-occurrence mapping data. Co-occurrence mapping data may be data that specifies certain power management settings that are frequently applied to systems with certain system characteristics that are used by users with certain usage habits. In some embodiments, co-occurrence mapping data may specify changes that are made to power management settings when users with certain usage habits switch from information handling systems with certain characteristics, such as low power consumption information handling systems, to information handling systems with other characteristics, such as high power consumption information handling systems. If a user's behavior changes, the information handling system may detect such a change and may update power management settings and/or a user persona accordingly.

Figure 3:
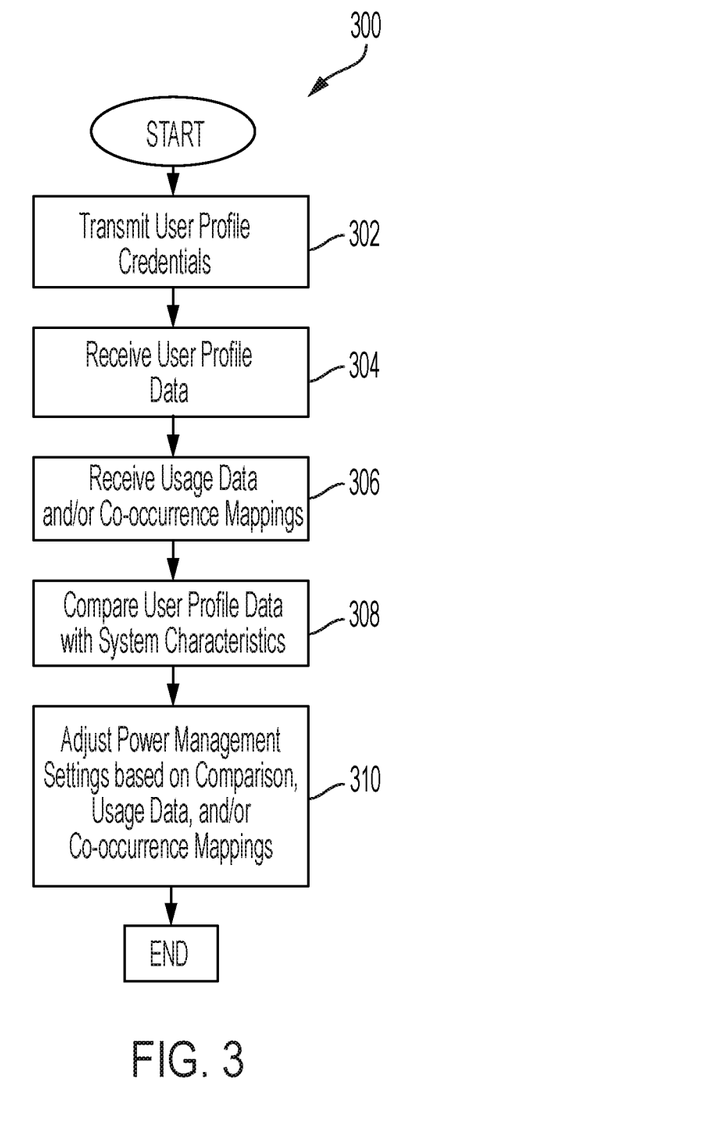
FIG. 3 is a flow chart of an example method for adjusting power management settings of an information handling system based on a user profile associated with a previously used information handling system according to some embodiments of the disclosure.

When a user having a pre-existing user profile associated with an information handling system begins to use a new information handling system, the user profile data associated with the user profile may be used to adjust one or more power management settings of the new information handling system. A method 300 of adjusting power management settings based on user profile data collected during use of an old information handling system is shown in FIG. 3. The method 300 may begin, at step 302, with transmission of user profile credentials. For example, when a user having a user profile first uses a new information handling system, the user may enter user identification, such as a network username, a profile username, and/or a password. The information handling system may transmit the user profile credentials to a remote server storing the user profile of the user. For example, the user profile may include learned user profile data, such as usage data, system characteristics of an old information handling system, such as hardware, firmware, and/or software characteristics, and power management settings, such as battery charge policies and/or system power consumption management policies associated with the user profile.

At step 304, the information handling system may receive user profile data. For example, then information handling system may receive learned user profile data, such as usage data collected from an old information handling system, system characteristics of the old information handling system, and one or more power management settings of the old information handling system. In some embodiments, the received user profile data may include a user persona classification associated with the user profile based on usage data collected from the old information handling system.

At step 306, the information handling system may receive usage data and/or co-occurrence mapping data. For example, the remote information handling system may collect usage data, system characteristics, and power management settings for a number of user profiles, and may use the collected data to determine what power management settings are most commonly applied to systems with certain system characteristics used by users with certain usage habits.

At step 308, the information handling system may compare the user profile data with one or more system characteristics of the new information handling system. The information handling system may compare received system characteristics of the old information handling system with the new information handling system and may determine changes to one or more power management settings of the new information handling system that should be implemented based on the differences. For example, the information handling system may compare received system characteristics of the old information handling system with new features of the new information handling system that were not present in the old information handling system and may determine that use of one or more of the new features of the new information handling system, such as improved battery charging capabilities, may improve performance of the new information handling system. In some embodiments, the information handling system may use co-occurrence mapping data received from the remote information handling system in the comparison.

At step 310, the information handling system may adjust power management settings based, at least in part, on the comparison. If the new information handling system has a greater battery capacity or health than, and/or charging capabilities that are different from, the old information handling system a battery charging policy of the new information handling system may be adjusted. For example, while a charging policy may have been set to express charge 1 on the old information handling system, a charging policy may be set to a faster express charge 2 on the new information handling system, when the new information handling system has enhanced charging capabilities. If the new information handling system consumes less power than the old information handling system, a power consumption management policy may be adjusted to enhance system performance, while maintaining sufficient runtime while operating on the battery. As another example, the system characteristics of the information handling system and the system characteristics of the old information handling system may be compared with co-occurrence data showing policy changes that were made when other users with similar usage data switched from information handling systems with system characteristics similar to the old information handling systems to information handling systems with system characteristics similar to the new information handling system. Power management settings of the new information handling system may be adjusted based on the comparison. As another example, the new information handling system may compare power management settings of systems having similar characteristics to the new information handling system associated with user profiles with usage habits similar to the user profile of the new information handling system and may adjust power management settings of the new information handling system based, at least in part, on the comparison. The new information handling system may apply policies associated with the most frequently recurring combinations of similar usage data associated with the user profile and similar system characteristics.

After power management settings have been adjusted, the information handling system may monitor usage by the user and may further adjust power management settings accordingly, similar to the process described at steps 206-212 of method 200. Thus, a user profile may be migrated to a new information handling system, and one or more power management settings of the new information handling system may be adjusted based, at least in part, on usage data collected from the old information handling system and differences in system characteristics between the old information handling system and the new information handling system.

Figure 4:
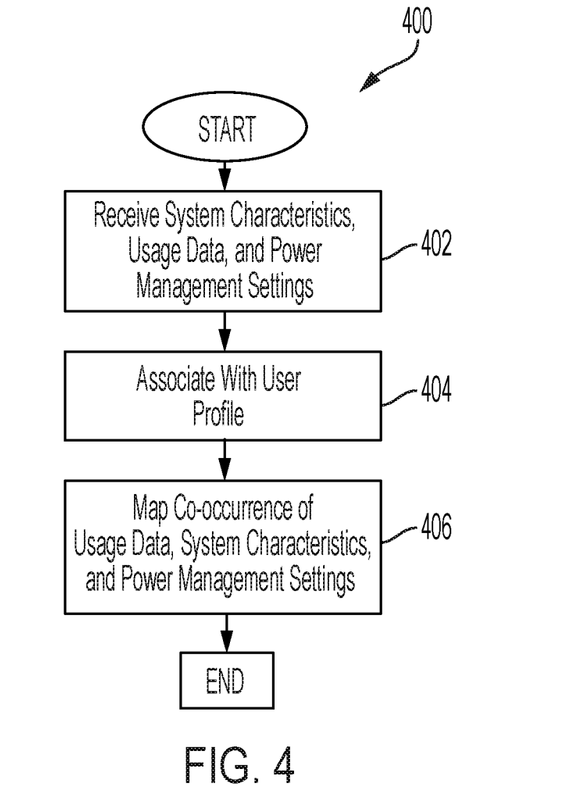
FIG. 4 is flow chart of an example method for collecting, by a remote server, user data associated with user profiles and processing the data to create co-occurrence data according to some embodiments of the disclosure.

A remote server may associate telemetry data with a user profile and may analyze telemetry data and user profiles to map co-occurrence data. A method 400 for mapping of co-occurrence data is shown in FIG. 4. The method 400 may begin, at step 402, with receipt of system characteristics, usage data, and power management settings. At step 404, system characteristics, usage data, and power management settings received from one or more information handling systems may be associated with a user profile. System characteristics, usage data, and power management settings for multiple users may be received and associated with user profiles. At step 406, the remote server may map co-occurrence of usage data, system characteristics, and power management settings. For example, the remote server may determine what power management settings are commonly implemented when users with user profiles indicating certain usage habits, as shown by usage data, operate information handling systems with certain system characteristics. Alternatively or additionally, the remote server may determine changes in power managements settings that are typically made when users with user profiles showing certain usage habits switch from an information handling system with a first set of usage characteristics to an information handling system with a second set of usage characteristics. For example, a user when user's with user profiles having a persona classification of marathon battery user switch from information handling systems having a low battery health rating to information handling systems having a high battery health rating, a battery charging policy may be adjusted from a slow charging policy to a fast charging policy. Thus, the server may map co-occurrence of system characteristics, usage data, and power management settings. In some cases, certain power management settings may be assigned to certain user persona classifications.

Figure 5:
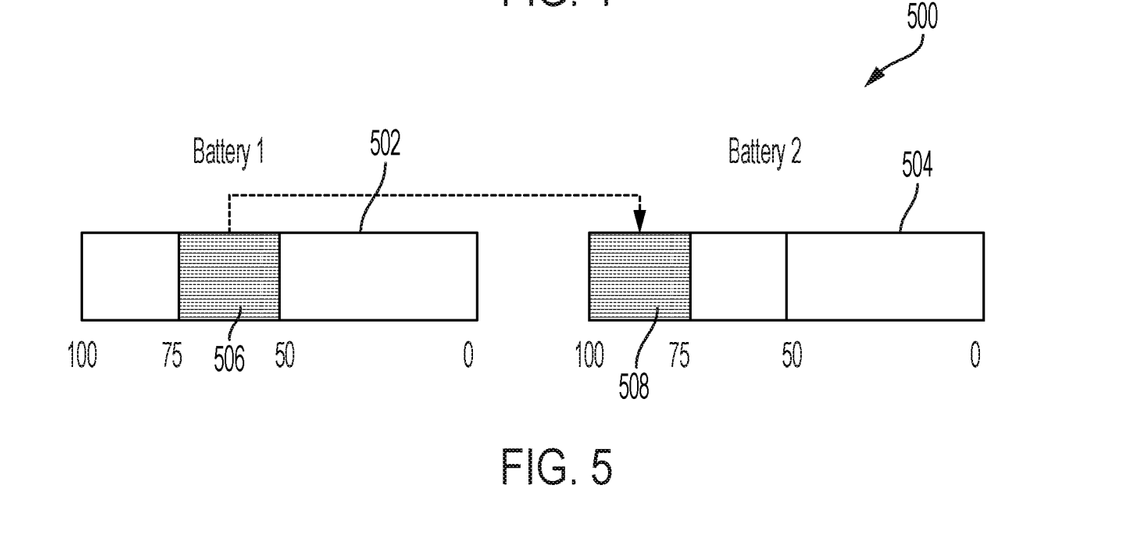
FIG. 5 is a diagram of an example change in battery parameters from a first information handling system to a second information handling system according to some embodiments of the disclosure.

In some cases, a user may upgrade from an information handling system with a battery with lower health to an information handling system with a battery with greater health. For example, a user may replace an outdated information handling system with a new information handling system. Alternatively or additionally, a user may replace a battery in an information handling system. An example illustration 500 of a change in battery health is shown in FIG. 5. As shown in FIG. 5, a first battery 502 may have a battery health in a 50%-75% range 506. For example, when a user acquires an information handling system a battery of the information handling system may start with a battery health of at or about 100%. Over a period of use the battery health may decrease. A user may replace an information handling system with an information handling system having a new battery or may replace the battery of the old information handling system. The new battery may have a battery health in a 75% to 100% range 508. Battery health is one example of a system characteristic, as discussed with respect to FIGS. 1-4. When a user switches from an information handling system with a first battery 502 having a battery health within a 50%-75% range 506 to an information handling system having a second battery 504 with a battery health in a 75%-100% range 508, one or more system power management settings of the second information handling system may be set differently from system power management settings on the first information handling system, based on user behavior data collected from the first information handling system and the change in battery health from the first range 506 to the second range 508. As another example of a difference in system characteristics between information handling systems, a user may upgrade from a Precision 5520 with a high power consumption ranking to an XPS 13 with a low power consumption ranking. For example, if the second information handling system has enhanced charging capabilities, such as one or more systems that enable a faster charging speed than the first information handling system, a battery charging policy may be changed from express charge 1, on the first information handling system, to express charge 2, on the second information handling system to take advantage of the enhanced charging capabilities, but a runtime power management policy may be maintained as policy A. Alternatively, system power management settings may be similarly adjusted if a user replaces or upgrades a battery of the same information handling system. In some cases, a battery may be classified in one of three battery health bins: 75%-100%, 50%-75%, and less than 50%. Alternatively or additionally, more precise battery health statistics may be reported by the battery and/or determined by the information handling system, down to a fraction of a percent. In some embodiments, the information handling system may assign a state of health factor to the battery.

Figure 6:
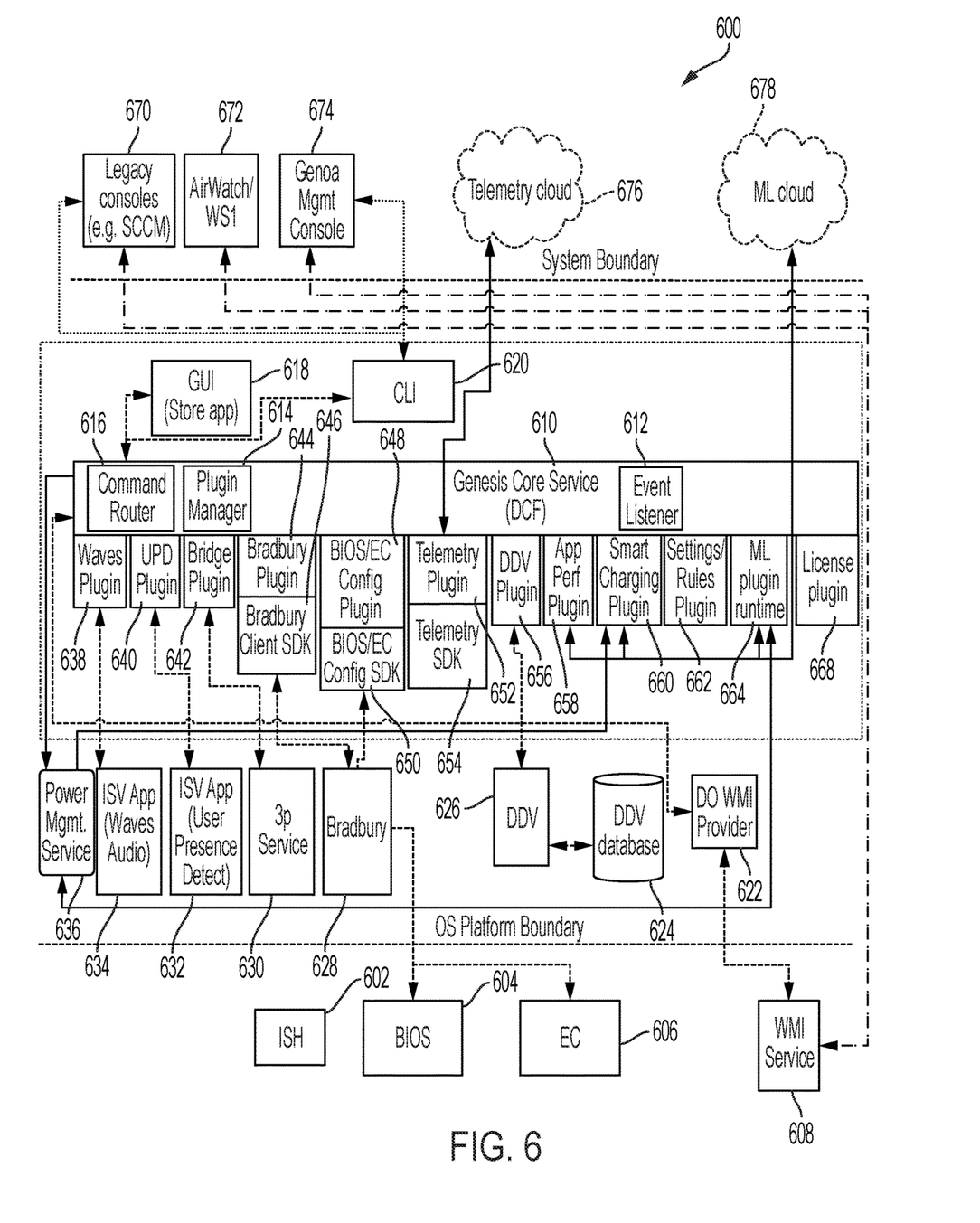
FIG. 6 is a block diagram of an example information handling system according to some embodiments of the disclosure.

A power management service may be used to set one or more power management settings of an information handling system. An example system 600 including an information handling system and several connected systems is shown in FIG. 6. The information handling system may include a core service 610. The core service 610 may be an optimizer core service, such as a genesis core service. The core service 610 may include a command router 616, a plug-in manager 614, and an event listener 612. The command router 616 and plugin manager 614 may interface with a power management service 636 which may collect user behavioral data and system characteristics and may determine one more power management settings for the information handling system. The information handling system may further include a waves plugin 638, a user program division (UPD) plugin 640, a bridge plugin 642, a Bradbury plugin 644 and Bradbury client software development kit (SDK) 646, a BIOS/embedded controller (EC) configuration plugin 648 and BIOS/EC configuration SDK 650, a telemetry plugin 652 and telemetry SDK 654, a data vault plugin 656, an application performance plugin 658, a smart charging plugin 660, a settings and rules plugin 662, a machine learning (ML) plugin runtime 664, and a license plugin 668. The waves plugin 638 may interface with an independent software vendor (ISV) waves audio application 634. The UPD plugin 640 may interface with an ISV user presence detection application 632. The bridge plugin 642 may interface with a 3P service 630. The Bradbury plugin 644, Bradbury client SDK 646, BIOS/EC configuration plugin 648, and BIOS/EC configuration SDK 650 may interface with a Bradbury system process 628. The Bradbury system process 628 may interface with a BIOS 604 and embedded controller 606 of the information handling system. The data vault plugin 656 may interface with a data vault system process and/or application 626, which may interface with a data vault database 624. The data vault database 624 may, for example, be a remote cloud-based database. A Windows Management Interface (WMI) provider system process and/or application 622 may interface between the core service 610 and a WMI service 608. The power management service 363 may interface with the smart charging plugin 660 and the ML plugin runtime 664 to adjust one or more system power management settings such as one or more battery charging policies and/or system power consumption management policies. The smart charging plugin 660 may subscribe to the core service 610. The core service 610 may subscribe to the ML plugin runtime 664 to receive ML updates. The core service 610 may also receive policy updates from the power management service 636. The machine learning plugin runtime 664 may apply one or more machine learning algorithms to analyze usage data of the information handling system to determine one or more power management settings that should be adjusted on the information handling system and may interact with the smart charging plugin 660 and the application performance plugin 658. The information handling system may also include an inter-sensor hub (ISH) 602. The information handling system may also include a command line interface (CLI) 620 and a graphical user interface (GUI) 618, such as a store application, both of which may interface with the core service 610.

The information handling system of FIG. 6 may connect to several remote systems. For example, the information handling system may connect to one or more legacy consoles 670, such as a system center configuration manager (SCCM), an AirWatch Workspace one system 672, and/or a Genoa management console 674 through WMI service 608. The information handling system may also interface with legacy consoles 670 and/or the Genoa management console 674 through the command line interface 620. The telemetry plugin 652 of the information handling system may interface with a telemetry cloud 676. For example, the telemetry plugin 652 may include a telemetry toolkit for transmitting collected usage data to the cloud. The ML plugin runtime 664 may interface with an external machine learning cloud 678 which may aggregate usage data, system parameters, and system power management settings from many information handling systems. The machine learning cloud 678 may apply machine learning algorithms to aggregated data to determine system power management settings that improve operating conditions on information handling systems with certain system characteristics that are used by users with certain usage habits.

The schematic flow chart diagrams of FIGS. 2-4 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A method for information handling system power management, comprising:
   receiving, by a first information handling system with first one or more system characteristics, user profile data associated with a user profile that was generated based on usage of a second information handling system with second one or more system characteristics and one or more second power management settings;
   receiving, by the first information handling system, co-occurrence mapping data correlating co-occurrence of profiles, system characteristics, and power management settings of other information handling systems; and
   adjusting one or more first power management settings of the first information handling system based, at least in part, on the user profile data, the first one or more system characteristics of the first information handling system, and the co-occurrence mapping data, wherein the adjusting uses the co-occurrence mapping data to map the one or more second power management settings of the second information handling system to the one or more first power management settings of the first information handling system.

2. The method of claim 1, wherein the received user profile data comprises usage data associated with the user profile collected from the second information handling system.

3. The method of claim 1, wherein the received user profile data comprises a user persona classification determined based on usage data associated with the user profile.

4. The method of claim 1, further comprising:
   monitoring usage of the first information handling system; and
   further adjusting the one or more power management settings based on the monitored usage of the first information handling system.

5. The method of claim 1, wherein the one or more first power management settings comprise at least one of:
   a battery charge policy; and
   a system power consumption management policy.

6. The method of claim 1, wherein the first one or more system characteristics comprise at least one of:
   a battery health;
   a system power consumption ranking; and a battery capacity.

7. An information handling system comprising:
   a processor; and
   a memory,
      wherein the processor is coupled to the memory and configured to perform steps comprising:
         receiving, by the processor of the information handling system having first one or more system characteristics, user profile data associated with a user profile that was generated based on usage of a second information handling system with second one or more system characteristics and one or more second power management settings;
         receiving, by the processor, co-occurrence mapping data correlating co-occurrence of profiles, system characteristics, and power management settings of other information handling systems; and
         adjusting one or more first power management settings of the information handling system based, at least in part, on the user profile data, with the first one or more system characteristics of the information handling system, and the co-occurrence mapping data, wherein the adjusting uses the co-occurrence mapping data to map the one or more second power management settings of the second information handling system to the one or more first power management settings of the information handling system.

8. The information handling system of claim 7, wherein the received user profile data comprises usage data associated with the user profile collected from the second information handling system.

9. The information handling system of claim 7, wherein the received user profile data comprises a user persona classification determined based on usage data associated with the user profile.

10. The information handling system of claim 7, wherein the processor is configured to perform steps further comprising:
    monitoring usage of the information handling system; and
    further adjusting the one or more power management settings based on the monitored usage of the information handling system.

11. The information handling system of claim 7, wherein the one or more first power management settings comprise at least one of:
    a battery charge policy; and
    a system power consumption management policy.

12. The information handling system of claim 7, wherein the first one or more system characteristics comprise at least one of:
    a battery health;
    a system power consumption ranking; and
    a battery capacity.

13. A computer program product comprising:
    a non-transitory computer readable medium comprising instructions for causing a first information handling system with first one or more system characteristics to perform steps comprising:
       receiving user profile data associated with a user profile that was generated based on usage of a second information handling system with second one or more system characteristics and one or more second power management settings;

receiving co-occurrence mapping data correlating co-occurrence of profiles, system characteristics, and power management settings of other information handling systems; and adjusting one or more first power management settings of the information handling system based, at least in part, on the user profile data, the first one or more system characteristics of the first information handling system, and the co-occurrence mapping data, wherein the adjusting uses the co-occurrence mapping data to map the one or more second power management settings of the second information handling system to the one or more first power management settings of the first information handling system.

14. The computer program product of claim 13, wherein the received user profile data comprises usage data associated with the user profile collected from the second information handling system.

15. The computer program product of claim 13, wherein the received user profile data comprises a user persona classification determined based on usage data associated with the user profile.

16. The computer program product of claim 13, wherein the one or more first power management settings comprise at least one of:

a battery charge policy; and a system power consumption management policy.

17. The computer program product of claim 13, wherein the first one or more system characteristics comprise at least one of:

a battery health;

a system power consumption ranking; and a battery capacity.

18. The method of claim 1, wherein the co-occurrence mapping data correlates certain power management settings that match usage data associated with the user profile data.

19. The method of claim 18, wherein adjusting one or more power management settings comprises adjusting a first charging policy for the first information handling system to a value different from a second charging policy of the user profile data for the second information handling system based on the first one or more system characteristics of the first information handling system specifying a first battery status and based on co-occurrence mapping data specifying the second charging policy for users corresponding to the user profile data.

20. The information handling system of claim 7, wherein the co-occurrence mapping data maps power management settings that have been applied in the other information handling systems with similar system characteristics as the first one or more system characteristics of the first information handling system when associated with other user profiles including similar usage data as usage data of the user profile data.

\* \* \* \* \*